US008159546B2

(12) United States Patent
Mindrum et al.

(10) Patent No.: US 8,159,546 B2
(45) Date of Patent: *Apr. 17, 2012

(54) IMAGE CAPTURE AND DISTRIBUTION SYSTEM AND METHOD

(75) Inventors: Gordon Scott Mindrum, Cincinnati, OH (US); Steven Craig Sefton, West Chester, OH (US); Jeffrey Jon Johnson, West Chester, OH (US)

(73) Assignee: Making Everlasting Memories, LLC, Cincinnati, OH (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/684,169

(22) Filed: Jan. 8, 2010

(65) Prior Publication Data

US 2010/0113069 A1    May 6, 2010

Related U.S. Application Data

(63) Continuation of application No. 11/009,543, filed on Dec. 10, 2004, now Pat. No. 7,671,902.

(51) Int. Cl.
*H04N 5/232* (2006.01)
*H04N 5/76* (2006.01)

(52) U.S. Cl. ............... 348/211.3; 348/231.2; 700/200

(58) Field of Classification Search ............ 348/207.99, 348/211.1, 207.11, 231.2; 700/200
See application file for complete search history.

(56) References Cited

U.S. PATENT DOCUMENTS

| | | | |
|---|---|---|---|
| 6,396,537 B1 | 5/2002 | Squilla et al. | |
| 7,203,367 B2 | 4/2007 | Shniberg et al. | |
| 7,924,323 B2 | 4/2011 | Walker et al. | |
| 2002/0113879 A1* | 8/2002 | Battle et al. | 348/207.2 |
| 2002/0170056 A1* | 11/2002 | Akiyama et al. | 725/35 |
| 2003/0118216 A1* | 6/2003 | Goldberg | 382/115 |
| 2004/0012811 A1* | 1/2004 | Nakayama | 358/1.15 |
| 2004/0030756 A1* | 2/2004 | Matsuyama et al. | 709/217 |
| 2004/0064339 A1* | 4/2004 | Shiota et al. | 705/1 |
| 2004/0102989 A1* | 5/2004 | Jang et al. | 705/1 |
| 2005/0090322 A1* | 4/2005 | Henry et al. | 472/117 |
| 2006/0028398 A1* | 2/2006 | Willmore | 345/2.3 |
| 2006/0028555 A1* | 2/2006 | Fredlund | 348/211.4 |

* cited by examiner

*Primary Examiner* — Hung Lam
(74) *Attorney, Agent, or Firm* — Frost Brown Todd LLC

(57) ABSTRACT

Images captured at a venue and relating to one or more patrons of the venue are incorporated into one or more products in accordance with image selections and/or product selections made by the patron(s). The images may be captured at venues with a variety of image capture devices such as pre-mounted cameras, cell phones, cameras brought by patrons to the venue, or cameras provided to patrons by the venue or another entity. The patrons may obtain products such as T-shirts, coffee mugs, prints, slideshows, or other products incorporating one or more selected images. Patrons may also view the images on portable electronic devices.

19 Claims, 6 Drawing Sheets

| | |
|---|---|
| PATRON ID(S) | 210 |
| VENUE | 220 |
| TIME / DATE | 230 |
| POSITION / LOCATION WITHIN VENUE | 240 |
| AUDIO | 250 |
| IMAGE | 260 |

FIG. 3

IMAGE CAPTURE AND DISTRIBUTION SYSTEM AND METHOD

This application is a continuation of U.S. Nonprovisional application Ser. No. 11/009,543, entitled "Image Capture and Distribution System and Method," filed on Dec. 10, 2004, the disclosure which is incorporated by reference herein.

BACKGROUND

People have been capturing and distributing images for many years, but no one prior to the inventors has created or used the invention described in the appended claims.

BRIEF DESCRIPTION OF DRAWINGS

While the specification concludes with claims that particularly point out and distinctly claim the invention, it is believed the present invention will be better understood from the following description taken in conjunction with the accompanying drawings, in which like reference numerals identify the same elements. The drawing and detailed description which follow are intended to be merely illustrative and are not intended to limit the scope of the invention as set forth in the appended claims.

FIG. 3 depicts an embodiment of an image file data structure.

DETAILED DESCRIPTION

The following description should not be used to limit the scope of the present invention. Other examples, features, aspects, embodiments, and advantages of the invention will become apparent to those skilled in the art from the following description, which includes by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
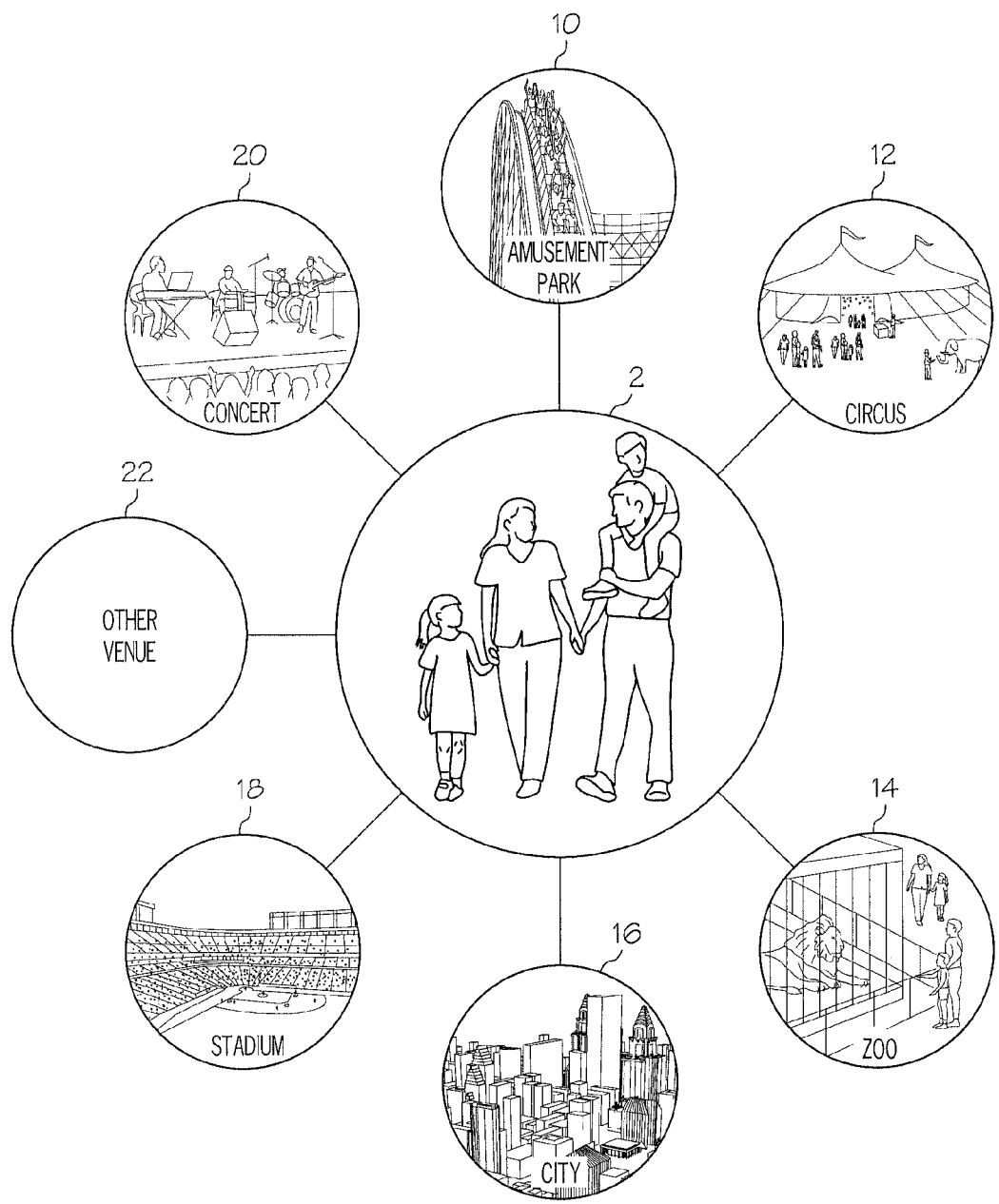
FIG. 1 depicts exemplary embodiments of patrons and venues.

FIG. 1 depicts exemplary embodiments of patrons (2) and venues. Those of ordinary skill in the art will appreciate that a variety of images may be captured at virtually any venue. Such images may comprise still images, video images, and/or combinations thereof. Visitors or patrons (2) of the venue may desire to have a product that includes or incorporates one or more images relating to the venue, including, for instance, images relating to the patron's own experience at the venue.

As used herein, the term "venue" includes any place or event where images may be captured. Included among the various types of venues are geographic venues, event venues, and hybrid venues. Other types of venues will be apparent to those of ordinary skill in the art.

A "geographic venue" includes a place that has a substantially fixed or consistent geographic location. A geographic venue is not typically visited for a particular event per se. Examples of geographic venues include, but are not limited to, parks of all sorts, such as amusement parks (10), zoos (14), resorts, a city's downtown area (16), and the like. Other geographic venues will be apparent to those of ordinary skill in the art.

An "event venue" includes any event that may occur at a variety of locations. An event venue is not limited to a particular fixed or consistent geographic location per se. Examples of event venues include, but are not limited to, cruise ships, weddings, proms, graduations, bar mitzvahs, and the like. Other event venues will be apparent to those of ordinary skill in the art.

A "hybrid venue" includes venues having characteristics of both geographic venues and event venues. Hybrid venues include events that typically occur at a limited number of fixed or consistent geographic locations. Hybrid venues also include geographic locations that are typically visited for a particular event. Examples of hybrid venues include, but are not limited to, fairs, carnivals, airshows, whitewater rafting trips, circuses (12), festivals, concerts (20), a sporting event at a stadium (18), conventions, and the like. Other hybrid venues will be apparent to those of ordinary skill in the art.

Any venue, regardless of the type of venue, may have a plurality or patrons (2) present at a time. As used herein, the term "patron" (2) is meant to include any type of person or group at any type of venue. Accordingly, the term patron (2) should not be read to require a particular relationship between the person and the venue, such as one where money is exchanged by way of example only. Thus, terms like "visitor," "person," and "patron" (2) will be used interchangeably herein. In addition, a patron (2) may include a group of people who are at the venue, where such people of the group have some sort of relation to each other. For instance, where a family of four goes to an amusement park (10), the entire family may be collectively regarded as a patron (2) of that venue, as may each individual person within the family of four. As another merely illustrative example, where a school class goes to a zoo (14), the entire class may be collectively regarded as a patron (2) of that venue, as well as each member of the class. A patron to a venue may be a paying patron, in which the patron pays to enter the venue, or a non-paying patron.

Figure 2:
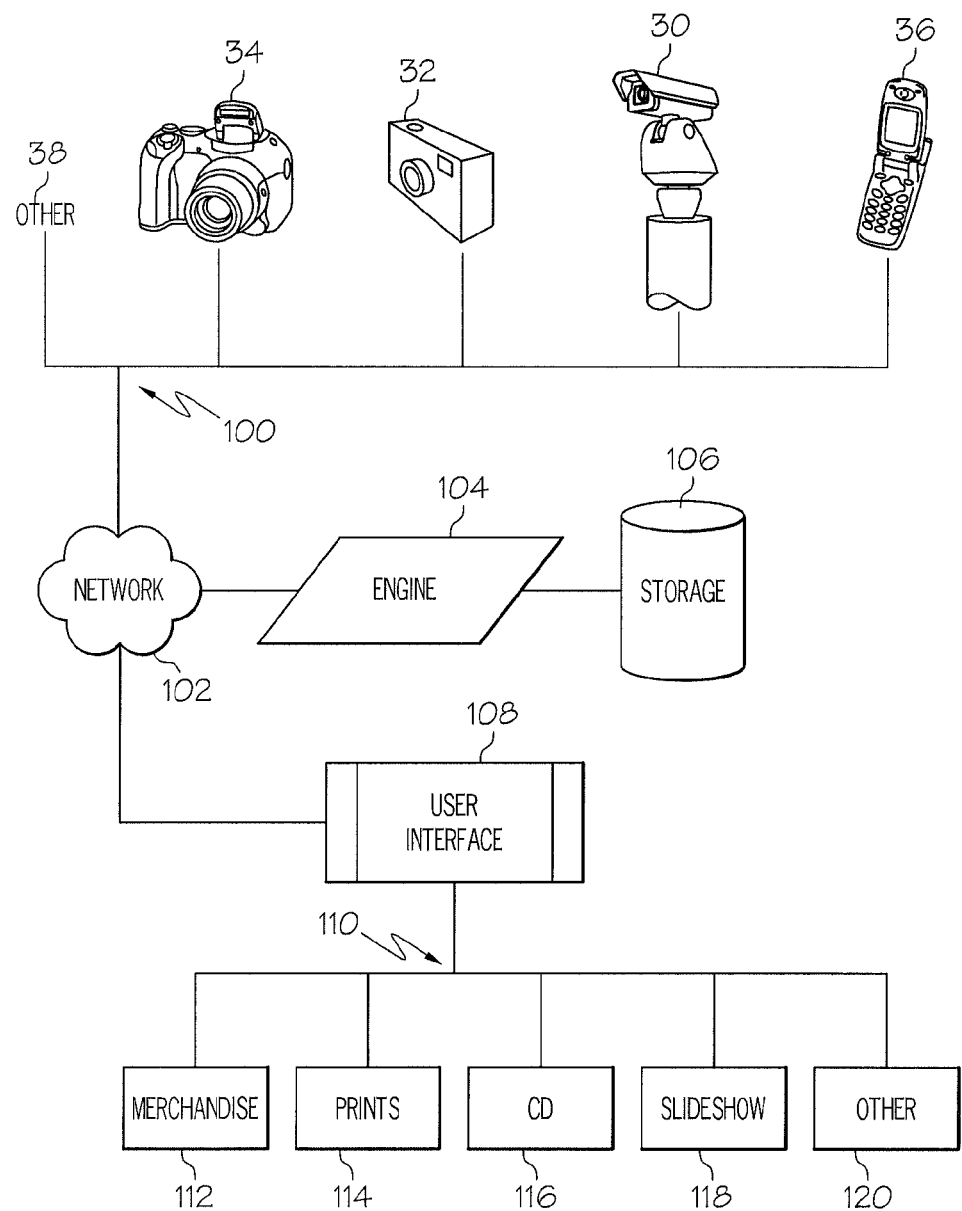
FIG. 2 depicts an embodiment of a system for distributing images.

In the present example, a plurality of images are captured while patrons (2) are at a venue. Such images may be captured by a variety of image capture devices (100), some of which are shown in FIG. 2. The images are communicated to a network (102) by any suitable means. A processing engine (104) is operable to associate the images with the patrons (2), such as associating or correlating each image communicated to the network (102) with at least one patron (2). Through a user interface (108) in communication with the network (102), patrons (2) may select images to be incorporated into a variety of products (110). A few exemplary products (110) are shown in FIG. 2.

Figure 4:
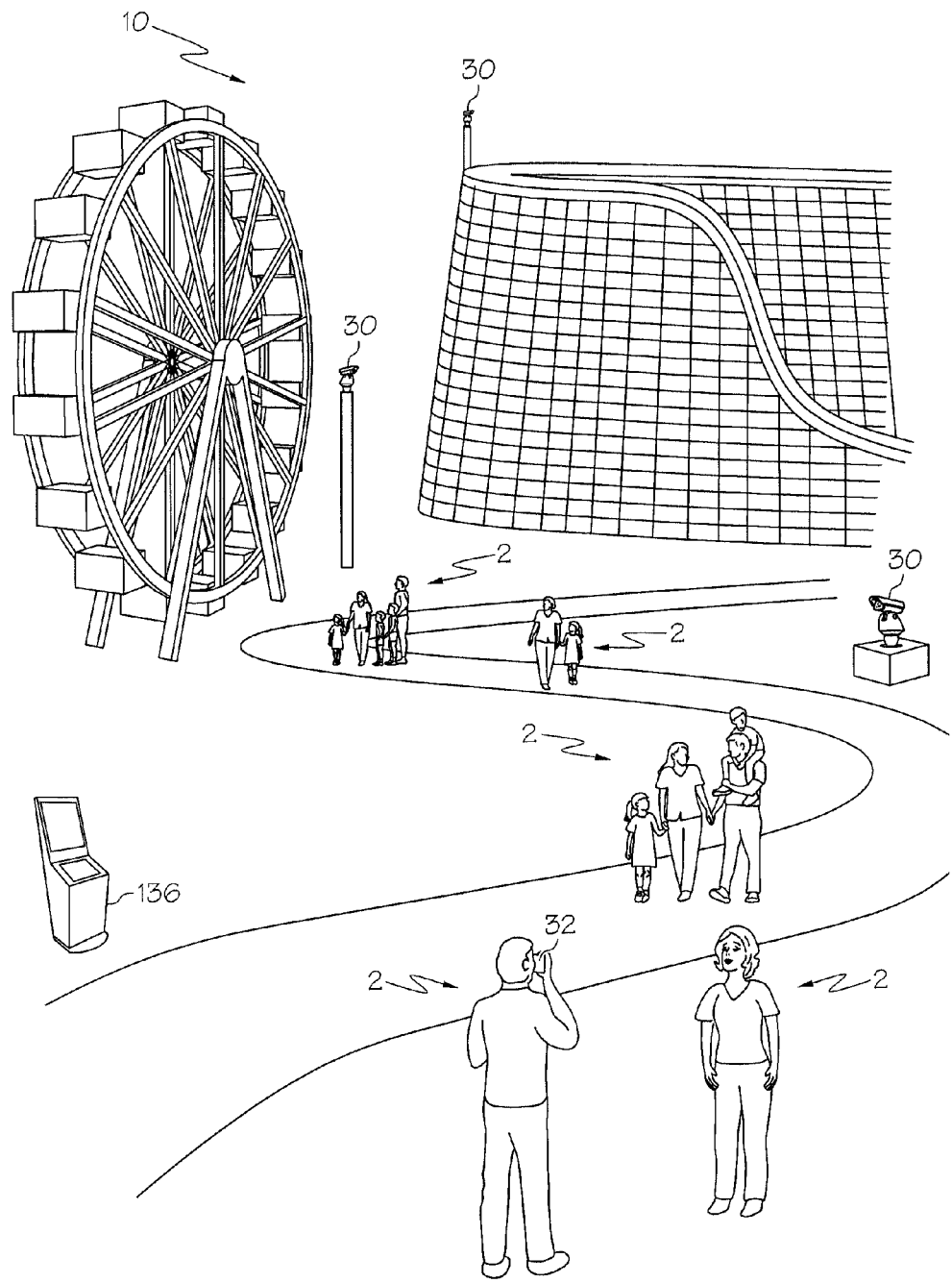
FIG. 4 depicts an exemplary setting for use of an embodiment of an image capture and distribution system.

Suitable image capture devices (100) may include a plurality of pre-mounted cameras (30) at the venue such as that shown in FIG. 4. Such pre-mounted cameras (30) are generally known, particularly in the context of amusement parks (10). By way of example only, pre-mounted cameras (30) may be mounted to structures such as buildings, roller coasters, posts, and the like. Other suitable locations for pre-mounted cameras (30) will be apparent to those of ordinary skill in the art.

Images captured by pre-mounted cameras (30) may be communicated to the network (102) via wire or wirelessly. Suitable means, methods, and media for communicating images from pre-mounted cameras (30) to the network (102) will be apparent to those of ordinary skill in the art.

In another embodiment, the image capture devices (100) include equipment provided to patrons (2) by the venue. By way of example only, such equipment may include a provided camera (32). Alternatively, the venue may provide a memory device to each patron (2), which may be used to store images captured by the patron's own camera (34). Other equipment that may be provided to patrons (2) by the venue will be apparent to those of ordinary skill in the art.

Where a provided camera (32) is used, there are various ways in which images captured by the provided camera (32) may be communicated to the network (102). In one embodiment, the patron (2) may pick up the provided camera (32), then drop the camera (32) off at any suitable location after capturing images with the camera (32). The images may then be extracted from the camera (32) and communicated to the network (102). Rather than dropping the camera (32) off, the patron (2) may stop at any suitable location to have images extracted from the camera (32), such as via a USB cable by way of example only, then continue capturing images with the camera (32). Other suitable methods and devices for extracting images from a provided camera (32) will be apparent to those of ordinary skill in the art.

In another embodiment of a provided camera (32), the camera (32) includes a removable memory device. In this embodiment, the patron (2) may drop the removable memory device off at any suitable location. The images may then be extracted from the removable memory device and communicated to the network (102). Optionally, the patron (2) may pick up another removable memory device when the patron (2) drops off the prior removable memory device, or wait for the images to be extracted from the prior removable memory device and take the device again. Of course, a patron (2) may be provided a plurality of removable memory devices with the provided camera (32), and drop off one or more of the removable memory devices as desired. Other ways in which provided removable memory devices may be used will be apparent to those of ordinary skill in the art.

In yet another embodiment, the provided camera (32) includes a transmitter for wirelessly transmitting image data. In one example of this embodiment, the venue includes a wireless local area network (WLAN), and has one or more receivers positioned at suitable locations. By way of example only, images may be communicated from the camera (32) to a receiver per the Bluetooth specification. Images may be wirelessly communicated as they are captured. Alternatively, the camera (32) may be operable to permit a patron (2) to preview and select images, such that only selected images are wirelessly communicated. Other variations will be apparent to those of ordinary skill in the art, including but not limited to alternative methods and devices for wirelessly transmitting or otherwise communicating images or image data from a provided camera (32) to a network (102).

In lieu of providing a camera (32) to a patron (2), the venue may provide a removable memory device that can be used with a patron's camera (34). While at the venue, the patron (2) may capture images with his or her own camera (34), and the images may be stored, at least temporarily, in the memory device provided by the venue. As with a removable memory device provided with a provided camera (32), images may be extracted from a memory device provided for a patron's camera (34) at any suitable time and location and communicated to the network (102).

Of course, the venue need not provide equipment to a patron (2) at all. By way of example only, an image capture device (100) may comprise a patron's camera (34), using the patron's own memory device. In this embodiment, images may be extracted from the patron's camera (34) at any suitable time and location, and using any suitable method or device. For instance, images may be extracted from a patron's camera (34) via a USB cable, then communicated to the network (102). Alternatively, images may be extracted from a patron's camera (34) via insertion of the camera's removable memory device into a slot at a kiosk (136). Where applicable, images may be communicated wirelessly from a patron's camera (34). Still other suitable methods and devices for extracting images from a patron's camera (34) will be apparent to those of ordinary skill in the art.

Regardless of the type of image capture device (100), images and/or other data may be extracted at a kiosk (136) located in the venue or elsewhere. In one embodiment, the kiosk (136) is an unmanned structure in communication with the network (102), such as the kiosk (136) shown in FIG. 4. In this embodiment, a patron (2) may connect the camera (32 or 34) to a part of the kiosk (136), such as by cable or dock, by way of example only, to permit extraction of images and/or other data from the camera (32 or 34). Alternatively, the kiosk (136) may include one or more slots or other features operable to receive images or other data from a removable storage device, such as a memory card or stick by way of example only, regardless of whether the removable storage device was provided to or brought by the patron (2). An unmanned kiosk (136) may also provide a user interface (108) for the selection of images and/or products (110). An unmanned kiosk may even provide one or more selected products (110), such prints (114), CDs (116), or other products (120). Still other suitable forms and features of an unmanned kiosk (136) will be apparent to those of ordinary skill in the art.

In another embodiment, the kiosk (136) is a manned structure, such that the kiosk (136) has at least one attendant. In this embodiment, the kiosk (136) may be a location where patrons (2) can pick up and/or drop off provided cameras (32); have images or other data extracted from a camera (32 or 34); and/or pick up and/or drop off one or more memory devices for a camera (32 or 34). It will also be appreciated that a manned kiosk (136) may be configured to permit patrons (2) to select images and/or products (110). Selected product(s) (110) may also be provided at a manned kiosk (136). Other suitable forms and features of a manned kiosk (136) will be apparent to those of ordinary skill in the art.

In yet another embodiment, an image capture device (100) comprises a cell phone (36). A variety of cell phones (36) exist that are operable to capture images. Many of these cell phones (36) are further operable to communicate such images. Thus, a patron (2) may use a cell phone (36) to capture one or more images at the venue, and the cell phone (36) may be used to communicate at least one of those images to the network (102). By way of example only, the patron (2) may be provided a telephone number to call and send images to via the patron's cell phone (36). Still other suitable methods and devices for communicating images to a network (102) via a cell phone will be apparent to those of ordinary skill in the art.

While several illustrative embodiments of image capture devices (100) have been described above, those of ordinary skill in the art will appreciate that there are several other suitable image capture devices (38), including variations of those described above, which may be used to capture images. In addition, it will be appreciated that images captured by an image capture device (100) may be communicated to a network (102) through a variety of methods and devices, including several not explicitly discussed above.

In addition to or as an alternative to images being captured by patrons (2) using image capture devices (100), or by pre-mounted cameras (30), images may be captured by photographers at the venue. Such photographers may be employees of the venue, be independent contractors, or have any other relationship with the venue or patrons (2). Photographers may be positioned at certain locations at the venue, may roam throughout the venue, or combinations of both. Photographers may capture images of or for patrons (2) using any suitable image capture device (100), including but not limited to the photographer's own camera, the patron's own camera (34), a provided camera (32), or the patron's cell phone (36). Images captured by photographers may be communicated to the network (102) via any suitable method or device. Other suitable variations and uses or functions of photographers will be apparent to those of ordinary skill in the art.

Images that are captured by one or more image capture devices (100) may be communicated via the network (102) to a processing engine (104). From the processing engine (104), images may be stored as image files (200) in storage device (106). FIG. 3 shows an exemplary embodiment of a data structure for an image file (200). As shown, the image file (200) includes data representing patron ID (210), venue (220), time and date (230), position/location within venue (240), audio (250), and the image (260).

The patron ID (210) portion of the image file (200) may include any type of data representing or otherwise corresponding to an identification of one or more patrons (2). Where a patron (2) comprises a group of people, the patron ID (210) may correspond to the patron (2) as a group, or a patron ID (210) may correspond to each individual patron (2) within the group. Either way, a patron ID (210) portion of an image file may provide a means for correlating a given image (260) with one or more particular patrons (2). Additionally, a patron ID (210) portion of an image file (200) may comprise several patron ID's (210). By way of example only, where a single image (260) corresponds to a plurality of patron (2) groups, and each patron (2) group has a respective patron ID (210), a single image file (200) may comprise the single image (260) (in the image (260) portion) and the plurality of patron ID's (210) (in the patron ID (210) portion). Alternatively, the single image (260) may be copied into a plurality of image files (200), each image file (200) having a single patron ID (210) in the respective patron ID (210) portion. Of course, a variety of other configurations may be used.

In one embodiment, a patron ID (210) comprises an alphanumeric string. Other suitable forms of patron ID (210) will be apparent to those of ordinary skill in the art.

It will be appreciated that there are a variety of ways in which patron ID (210) data may be acquired. In one embodiment, a patron (2) has a Radio Frequency Identification (RFID) tag. In this embodiment, each RFID tag is unique each patron (2), such that it may provide patron ID (210) differentiation. Such an RFID tag may be carried by a patron (2) in any suitable fashion. For instance, where the venue issues tickets for entry, the ticket may include an RFID tag. As another example, where equipment is provided to a patron (2) for an image capture device (100) (e.g., a provided camera (32) or a removable memory device provided for the patron's own camera (34)), the RFID tag may be included in or on the provided equipment. RFID sensors may be positioned at various locations in the venue, and may be operable to detect RFID tags and register information embodied therein.

For instance, a roller coaster at an amusement park (10) may have several pre-mounted cameras (30) and an RFID sensor. When patrons (2) riding the roller coaster pass by the RFID sensor, the sensor registers the information embodied in RFID tags held by the patrons. With each patron (2) having a unique RFID tag, patron ID (210) information may thus be determined with respect to the patrons (2) riding the roller coaster at that time. Accordingly, where images are captured by pre-mounted cameras (30) during the same roller coaster ride, such images may be correlated with the patron ID (210) information collected by the RFID sensor. In other words, each image file (200) that includes an image (260) captured of the roller coaster ride may also include a patron ID (210) portion corresponding to each patron (2) who was on the ride (as detected by the RFID sensor). Alternatively, a single image file (200) that includes an image (260) captured of the roller coaster ride may also include a patron ID (210) portion comprising patron ID's (210) for all patrons (2) who were on the ride. Other ways in which patron ID (210) information may be provided or obtained from RFID tags will be apparent to those of ordinary skill in the art.

In another embodiment, a patron (2) has an object with a unique magnetic strip or bar code on a card. Such an object may include a ticket, card, or any other object. Patron ID (210) data may thus be obtained, at least in part, through a card reader. For instance, using the example of a roller coaster with pre-placed cameras (30), patrons (2) may pass their respective cards strips through a reader right before boarding the roller coaster. Like the RFID sensor, the reader may register the patron ID (210) associated with each patron (2). Accordingly, where images are captured by pre-mounted cameras (30) during the same roller coaster ride, such images may be correlated with the patron ID (210) information collected by the magnetic strip sensor. Other ways in which patron ID (210) information may be provided or obtained from cards will be apparent to those of ordinary skill in the art.

In yet another embodiment, a patron (2) has one or more unique chits. Such chits may provide, at least in part, a form of patron ID (210). In other words, a chit may facilitate the correlation of a given image (260) with a patron (2). Chits may be collected by a patron (2) during a visit to a venue. By way of example only, where pre-mounted cameras (30) are used, a patron (2) may take a chit at or near each location that an image is captured. Where a photographer is used to capture images of or for patrons (2), the photographer may give a chit to each patron (2). In either case, the chit(s) will correspond to images (260) with respect to time and/or place of image capture. For instance, each chit may have a number printed thereon or a bar code, etc. which is indicative of the time and/or place of image capture. After a desired number of images have been captured, a patron (2) may submit one or more of the chits held by the patron (2). A patron ID (210), such as a string, may be assigned upon the submission of the chit(s). This patron ID (210) may be correlated with time/place information embodied in the chit(s), thereby providing a correlation between the patron ID (210) and the images corresponding to the chit(s). Other ways in which patron ID (210) information may relate to chits collected by a patron (2) will be apparent to those of ordinary skill in the art.

Alternatively, a patron (2) may be provided a plurality of chits, such as upon entry at the venue or in advance, such that the patron (2) may distribute chits during a visit to the venue. The chits may contain a unique number, bar code, or the like, which will correspond to that patron (2) as a form of patron ID (210). In this example, the patron (2) may leave a chit at selected locations where images are captured. Chits and images (260) may be correlated at such locations, which may effect a correlation of patron ID (210) and images (260). Alternative methods for using chits to provide a form of patron ID (210), including but not limited to variations of taking chits and/or leaving chits, will be apparent to those of ordinary skill in the art.

In another embodiment, photo equipment provided to a patron (2) by the venue or other entity provides a form of patron ID (210). Such equipment may include, but is not limited to, a provided camera (32) or a removable memory device to be used with a patron's own camera (34). By way of example only, a piece of equipment provided to a patron (2) may have its own unique equipment identifier. When the equipment is provided to the patron (2), this equipment identifier may act, at least in part, as a patron ID (210) for the patron (2) to whom the equipment is provided.

The equipment identifier may be a number, bar code, or the like on the outside of the equipment. When images (260) are extracted from the equipment, the equipment identifier may be noted, such as by reading or scanning, etc., thereby providing correlation between extracted images (260) and the equipment identifier—a form of patron ID (210).

Alternatively, the identifier may be provided from within the interior of the equipment. For instance, a provided camera (32) or memory device may be configured to provide equipment identifier data for images (260) captured with the camera (32) or stored on the memory device. Such data may be provided in the form of a header for each image (260) captured by and/or stored in the provided equipment. Alternatively, the equipment identifier may be provided upon the extraction of images (260) from the provided equipment. For instance, where the equipment is a provided camera (32) capable of wireless communication of images (260), the equipment identifier may be wirelessly communicated with one or more images (260) captured by the camera (32). An equipment identifier header may be provided for each individual image (260) or for a batch of images corresponding to the equipment. Other suitable forms and methods of using equipment identifiers to provide patron ID (210) will be apparent to those of ordinary skill in the art.

Where a cell phone (36) is used as an image capture device (100), patron ID (210) may be obtained through Automatic Number Identification (ANI) information provided by the phone or network. Where a patron (2) may submit or communicate images (260) captured with his/her cell phone (36) by placing a call with his/her cell phone (36), it will be appreciated that an ANI identifier (or similar identifier) for the cell phone (36) will be transmitted with the call. The ANI identifier may thus be correlated with the images (260) submitted or communicated through the call, thereby providing a form of patron ID (210). Other ways in which ANI identifiers (or similar identifiers) may provide a form of patron ID (210) will be apparent to those of ordinary skill in the art.

While a few merely illustrative examples have been cited showing how patron ID (210) data may be provided or acquired, those of ordinary skill in the art will appreciate that there are several alternative ways in which patron ID (210) data may be provided or acquired.

The venue (220) portion of the image file (200) may include any type of data representing or otherwise corresponding to an identification of the venue at which the image (260) was captured. While this portion is purely optional, as is every portion of the image file (200) of the present example, those of ordinary skill in the art will appreciate that a venue (220) portion may be desirable where any given image (260) could have been captured at a variety of venues. The venue (220) portion may thus provide a means for distinguishing between images (260) captured at one venue from images (260) captured at another venue. Still other ways of providing distinctions among images (260) captured at different venues will be apparent to those of ordinary skill in the art.

The time/date (230) portion of the image file (200) may include any type of data representing or otherwise corresponding to an identification of the time and date at which the image (260) was captured. Suitable forms of such data will be apparent to those of ordinary skill in the art. Of course, as an alternative, an image file (200) may lack a time/date (230) portion.

The position/location (240) portion of the image file (200) may include any type of data representing or otherwise corresponding to the position or location within the venue at which the image (260) was captured. Suitable forms of such data will be apparent to those of ordinary skill in the art.

In one embodiment, the position/location (240) data represents the position/location of the image capture device (100) at the time the corresponding image (260) was captured. In another embodiment, the position/location (240) data represents the position/location of a patron (2) at the time the image (260) was captured. In yet another embodiment, the position/location (240) data represents the position/location of the subject matter of the image (260). For instance, where a patron (2) captures an image (260) of an object from a great distance, the position/location (240) data may correspond to the position/location data of that object (instead of corresponding to the position/location of the patron (2) or image capture device (100) at the time the image was captured). Other positions/locations that position/location (240) data may represent will be apparent to those of ordinary skill in the art. Of course, as an alternative, an image file (200) may lack a position/location (240) portion.

It will be appreciated that there are a variety of ways in which position/location (240) data may be acquired. For example, as disclosed above, position/location (240) data may correspond to the location of the image capture device (100) at the time the image (260) was captured. In one embodiment, where the image capture devices (100) include pre-mounted cameras (30), each pre-mounted camera (30) has an identifier, such as a serial number or other string by way of example only. With each pre-mounted camera (30) having its own identifier and fixed position, the identifier may thus be indicative of the position of the pre-mounted camera (30). In this embodiment, this identifier is included as a header with each image (260) captured by a given pre-mounted camera (30). In another embodiment, a pre-mounted camera (30) includes a device such as a laser range finder, by way of example only, which would be operable to determine the position/location of at least a portion of the subject matter of the image (260). Other methods for acquiring or representing position/location (240) data for images captured by pre-mounted cameras (30) will be apparent to those of ordinary skill in the art.

In yet another embodiment, the position/location (240) data is acquired by a Global Positioning System (GPS) device that is included with an image capture device (100). By way of example only, a provided camera (32) may include a GPS device. Where the provided camera (32) is operable to communicate data wirelessly, the provided camera (32) may communicate position/location (240) data each time an image is captured. Alternatively, a camera (32 or 34) may store position/location (240) data, obtained through a GPS device, with each image (260) as each image is captured (e.g., as a header). Other ways in which a GPS device may be used to obtain position/location (240) information will be apparent to those of ordinary skill in the art. In addition, those of ordinary skill in the art will appreciate that there are a variety of alternative ways in which position/location (240) data corresponding to the position/location of an image capture device (100) may be acquired or represented.

In another embodiment, the position/location (240) data corresponds to the position/location of a patron (2) within the venue during or near the time at which the image (260) was captured. Those of ordinary skill in the art will appreciate that there are a variety of ways in which such position/location (240) data may be acquired or represented. By way of example only, where each patron (2) has an RFID tag, position/location (240) information may be acquired and registered by RFID sensors. In other words, where each RFID sensor has a known location, the sensor may detect the RFID tag held by the patron (2), thereby obtaining position/location (240) information relating to the patron (2). Such position/location (240) information may be correlated with the particular time at which the information was obtained. Where an image (260) is captured in spatial or temporal proximity to the sensor, and the time at which the image (260) was captured is known, the image (260) capture time and RFID detection time may be correlated, thereby providing approximate correlation between the image (260) and the position/location (240) of the patron (2). Other ways of obtaining position/location (240) information of a patron (2) and/or correlating the same with an image (260) using RFID technology will be apparent to those of ordinary skill in the art.

Similarly, position/location (240) information of a patron (2) may be obtained where the patron (2) has an object with a magnetic strip, bar code, or similar feature. Such information may be obtained by or through a reader in a manner similar to that described above with respect to the RFID sensors. In other words, a patron may pass the magnetic strip, bar code, or other feature before a reader having a known location, and the reader will register that patron (2) as having been at that location at that time. This time information may be correlated with time/date (230) information associated with an image (260), thereby providing approximate correlation between the image (260) and the position/location (240) of the patron (2). Other variations will be apparent to those of ordinary skill in the art.

Alternatively, a patron (2) may be provided with a GPS device, which may provide position/location (240) information of the patron (2) at a given time. In this example, the movement of the patron (2) may be tracked and/or stored as position/location (240) data in the storage device (106) or in any suitable location. Position/location (240) data may be collected, such as by pushing or pulling from the GPS device, at any suitable time interval. For instance, position/location (240) data may be collected periodically or every time an image (260) is captured, by way of example only. Each position represented by position/location (240) data may be associated with a particular time (e.g. the time at which the patron was at the position/location (240) represented by the position/location data (240)). Where time/date (230) information associated with an image (260) is known, the position/location (240) data may be correlated with the image (260), at least in part, on the basis of time. Alternative ways in which position/location (240) information corresponding to the position/location of a patron (2) may be obtained and/or correlated with an image (260) will be apparent to those of ordinary skill in the art.

While position/location (240) data has been discussed as representing the position/location of an image capture device (100), the subject matter of or object in an image (260), or a patron (2), it will be appreciated that position/location (240) data may represent any combination of these. For example, a single position/location (240) data portion of an image file (200) may represent more than one position/location (240) (e.g., the position/location (240) of a pre-mounted camera (30) and the position/location of a patron (2)). Alternatively, an image file (200) may have more than one position/location (240) portions, each representing a single position/location (240). Other configurations will be apparent to those of ordinary skill in the art.

The audio (250) portion of the image file (200) may include any type of data representing or otherwise corresponding to audio (250). The audio (250) may relate to the captured image (260), or may be unrelated. In one embodiment, the captured image (260) is a video image, and the audio (250) is synchronized with the video image. For instance, a venue may have one or more audio capture devices, such as microphones, positioned throughout the venue. Audio (250) captured by such devices may be synchronized or otherwise correlated with images (260) captured by an image capture device (100). Of course, an image capture device (100) may have a microphone operable to capture audio (250) corresponding to images (260) captured by the image capture device (100).

In another embodiment, the audio (250) portion comprises audio selected by a patron (2). For instance, through the user interface (108), a patron (2) may be permitted to select audio (250) such as sounds, music, and the like, including audio (250) held in the storage device (106) or submitted by the patron (2), by way of example only. Audio (250) may comprise any combination of sounds, music, and the like. Suitable forms of audio (250) data will be apparent to those of ordinary skill in the art. It will also be appreciated that audio (250) may accompany any type of image (260), such as a still image (260), a slideshow (118), or a video image (260), including combinations thereof. Of course, as an alternative, an image file (200) may lack an audio (250) portion.

Where an image file (200) comprises a plurality of portions, it will be appreciated that the data comprising such portions may be collected at any suitable time. In addition, it will be appreciated that an image file (200) may be assembled at any suitable time(s) and in any suitable location(s). In other words, various portions of an image file (200) may be added to the image file (200) at any time or place. For instance, where a pre-mounted camera (30) having a microphone is used, hardware in the pre-mounted camera may be configured to assemble and communicate an image file (200) comprising a time/date (230) portion, a position/location (240) portion, an audio (250) portion, and an image (260) portion. The engine (104) may receive this image file (200) through the network (102), where the engine (104) may correlate and add a patron ID (210) portion and a venue (220) portion to the image file (200).

As another merely illustrative example, where a provided camera (32) that has a GPS device and is capable of wireless communication is used, the camera (32) may be configured to communicate an image file (200) comprising a patron ID (210) portion, a venue (220) portion, a time/date (230) portion, a position/location (240) portion, and an image (260) portion to the network (102). The engine (104) may receive this image file (200) through the network (102), where the engine (104) may add an audio (250) portion to the image file (200) in response to selections and/or submissions made by the patron (2) via the user interface (108). Other suitable methods of forming image files (200), and other possible sources of data comprising an image file (200), will be apparent to those of ordinary skill in the art.

Figure 5:
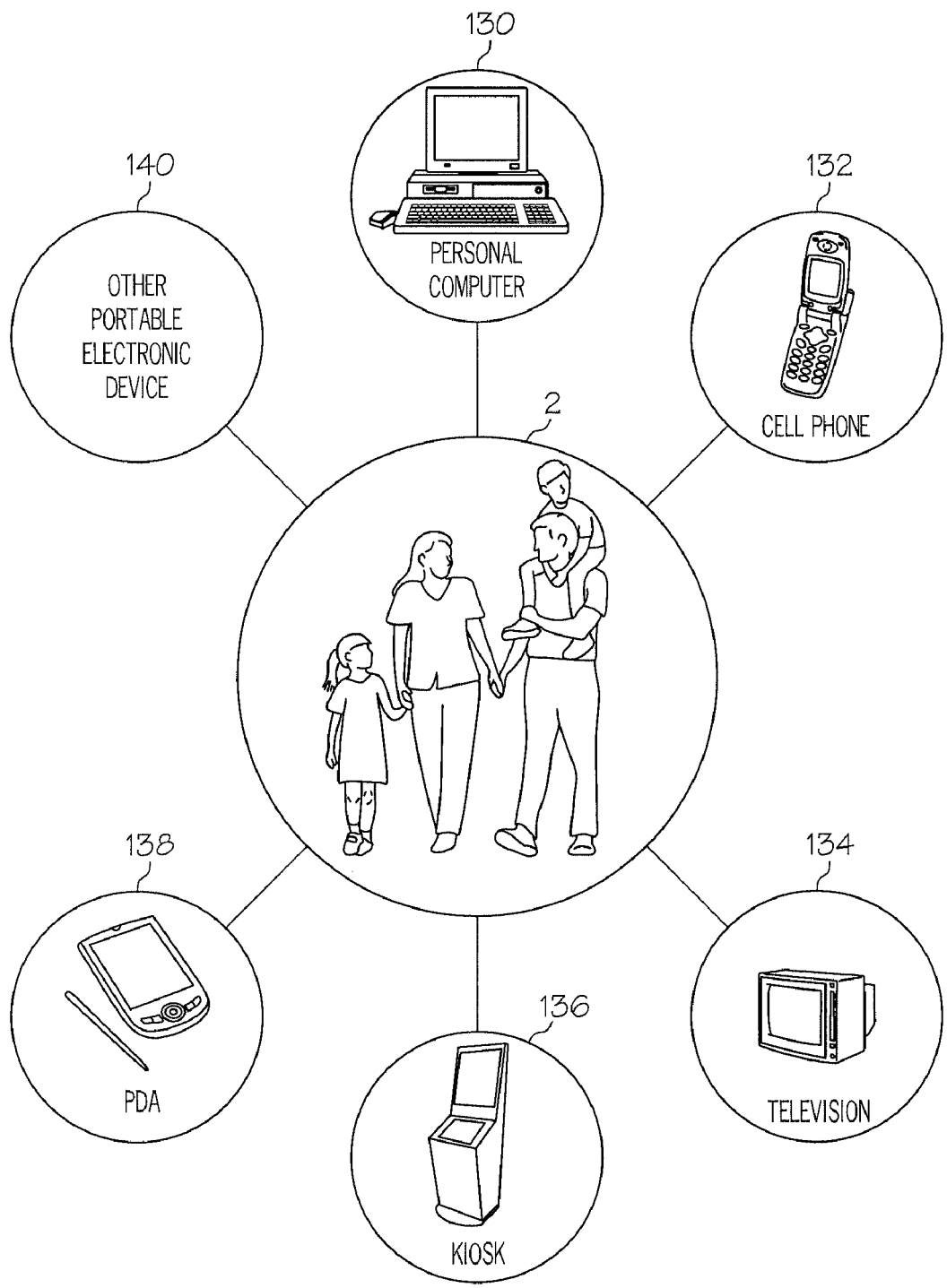
FIG. 5 depicts the patrons of FIG. 1 with exemplary interface devices.

After images have been captured, patrons (2) may be provided the opportunity to view one or more of the images through a user interface (108). A user interface (108) may be provided through any suitable device. FIG. 5 shows several exemplary user interface (108) devices, including a personal computer (130), a cell phone (132), a television (134), a kiosk (136), a personal digital assistant (PDA) (138), and an other portable electronic device (140). In one embodiment, a user interface (108) device comprises an iPOD, produced by Apple Computer, Inc. Other suitable user interface (108) devices will be apparent to those of ordinary skill in the art.

A patron (2) may also be provided the opportunity to select images, audio, and/or products (110) through the user interface (108). For example, through the user interface (108), a patron (2) may select one or more images and/or audio to be incorporated into one or more products (110). The user interface (108) may also provide patrons (2) the opportunity to select one or more types of products (110) in which selected images and/or audio are to be incorporated. The images available for selection by the patron (2) may include, but need not be limited to, images captured at the venue during the patron's visit to the venue and "stock" images (e.g. images originating outside of the venue, images pre-dating the patron's (2) visit to the venue, etc.).

In addition to providing a patron (2) the opportunity to review images and select images, audio, and/or products, a user interface (108) may also permit a user to make submissions of data. Such submissions may comprise, by way of example only, other images, audio, and the like. Other submissions will be apparent to those of ordinary skill in the art.

An optional feature of a user interface (108) comprises providing the ability for a patron (2) to alter one or more images or audio. Such alterations may include cropping, superimposing, adding visual effects, and any other type of alteration. Other features and configurations of a user interface (108) will be apparent to those of ordinary skill in the art.

Patron (2) selections and other input entered through the user interface (108) may be communicated to the engine (104) via a network (102). Alternatively, the user interface (108) may be in direct communication with the engine (104). The engine (104) may process the patron (2) selections or other input. In one embodiment, the engine (104) produces one or more products (110) incorporating patron (2) selections or other input. In another embodiment, the engine (104) causes one or more products (110) incorporating patron (2) selections or other input to be produced.

Several exemplary products (110) in which one or more images may be incorporated are shown in FIG. 2. Such products (110) include merchandise (112) (e.g., T-shirts, coffee mugs, key chains, etc.), prints (114), a CD (116), a slideshow (118), or any other type of product (120). Accordingly, a product (110) may be tangible (e.g., merchandise (112)) or intangible (e.g., a slideshow (118)). It will also be appreciated that the product (110) may be in the form of or otherwise embodied in any computer readable medium, including any suitable alternative to a CD (116), such as a DVD by way of example only. Where applicable, the engine (104) may produce the product(s) (110). Alternatively, where the engine (104) is not capable of producing a product (110), the engine (104) may otherwise cause the product (110) to be produced (e.g., by forwarding an order to a manufacturer, etc.). Other ways in which a product (110) may be produced will be apparent to those of ordinary skill in the art.

Figures 6, 7:
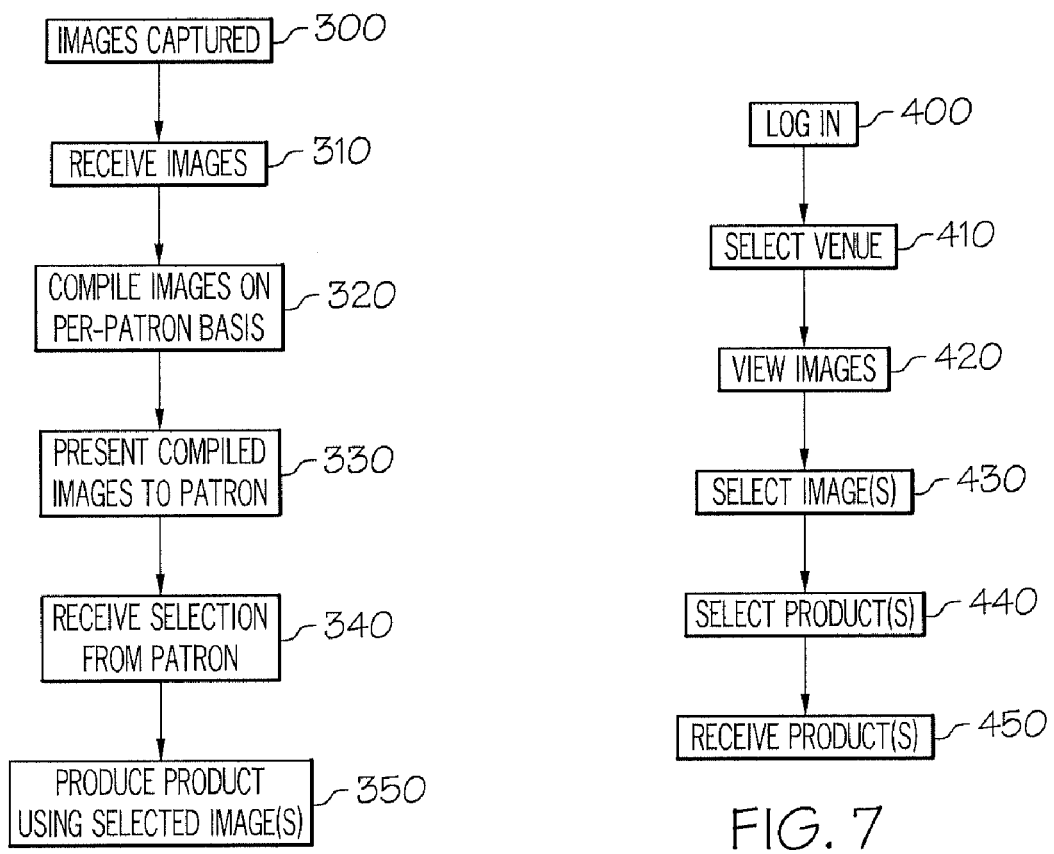
FIG. 6 depicts a block diagram showing an exemplary set of steps for capturing and distributing images.
FIG. 7 depicts a block diagram showing an exemplary set of steps for user interaction with a user interface for an embodiment of an image distribution system.

FIG. 6 shows a block diagram providing a summary of exemplary steps that may be performed according to one embodiment. First, as shown, images are captured (300). Such images may be captured by any suitable image capture device (110). Next, captured images are received (310), such as by the engine (104) through the network (102). The images are then compiled on a per-patron basis (320). This step may be performed by the engine (104), which may read data representing patron ID (210). Thus, the step of compiling images on a per-patron basis (320) may comprise correlating patron ID (210) data with image (260) data or any other data. Alternatively, images (260) may be correlated with patron ID (210) data prior to or after the images reach the engine (104). Thus, the step of compiling images on a per-patron basis (320) may comprise grouping image files (200) having corresponding patron ID (210) data. It will be appreciated that the step of compiling images on a per-patron basis (320) may be performed in response to some form of patron (2) input, such as the patron (2) logging on to a service. In other words, images may be compiled on a per-patron basis (320) at any suitable time. Other variations will be apparent to those of ordinary skill in the art.

In the present example, where images have been compiled on a per-patron basis (320), the compiled images may be presented to a patron (330). Where the engine (104) is performing at least a portion of the steps of the method of the present example, the engine (104) may then receive selections from the patron (340). Such selections may include, but need not be limited to, selections of images, audio, alterations, and/or products (110). The engine (104) may then produce, or cause to be produced, the selected product(s) using the selected image(s) (350). The product(s) (110) may be delivered to the patron (2) in any suitable fashion. It will be appreciated that the foregoing steps are merely illustrative, and that steps may be added, deleted, or otherwise changed. It will also be appreciated that any step, including a portion thereof, may be performed by any type or number of systems, including portions thereof.

FIG. 7 shows a block diagram providing a summary of exemplary steps that may be performed by a patron (2) according to an embodiment of a system in communication with the patron (2) via a user interface (108). First, a patron (2) logs in (400) to the system. By way of example only, the patron (2) may have a unique username and/or password for logging in (400). Next, the patron (2) selects a venue (410). The patron (2) then views images (410). These images may comprise images (260) that are embodied in image files (200) that have a venue (220) portion that corresponds with the patron's venue selection, and a patron ID (210) portion that corresponds with the username and/or password that the patron (2) used to log in (400). The viewed images may further comprise stock images. The patron (2) then selects one or more images (430), and selects one or more products (440). Finally, the patron (2) receives the one or more selected products (450). As with the steps illustrated in FIG. 6, it will be appreciated that the steps illustrated in FIG. 7 are merely illustrative, and that steps may be added, deleted, or otherwise changed. For instance, a non-patron may interact with the user interface (108). In other words, a friend or family member of the patron (2) may be permitted to access and interact with the user interface (108) to view images and/or make selections. Other variations will be apparent to those of ordinary skill in the art.

In another embodiment, the user interface (108) comprises an interactive map of the venue. Where the system includes data representing one or more position/locations (240) of a patron (2) during the patron's visit to the venue, the interactive map may indicate such positions/locations (240) with indicators. By way of example only, each such indicator may comprise a blinking dot at sites visited by the patron (2) within the venue. Similarly, where the system includes data representing one or more position/locations (240) where an image was captured, the interactive map may indicate such positions/locations (240). When a patron selects an indicator, such as by clicking on it with a mouse by way of example only, the user interface (108) may display one or more images that were captured at or near the corresponding position/location (240) in the venue. This may occur through correlation of the position/location (240) corresponding to the patron's indicator selection and position/location (240) portions of image files (200) that have a patron ID portion (210) corresponding to the patron (2) making the selections. Other features and variations of an interactive map will be apparent to those of ordinary skill in the art.

It will be appreciated that a service comprising embodiments of the present invention may be provided by any service provider. By way of example only, the service provider may be the same entity that owns or controls the venue. Alternatively, the service provider may be any other entity, such as a hotel. Following the merely illustrative example of a hotel, such a hotel may be affiliated with the venue, or have no affiliation or other relationship with the venue.

In one embodiment, the service provider is a hotel located proximate to the venue. Provided cameras (32) are provided by the hotel, and a user interface (108) device comprises a television (134) in a patron's hotel room. Thus, a patron (2) may take a provided camera (32) from the hotel to the venue and capture images at the venue with the provided camera (32). Upon returning to the hotel room, the patron (2) may, on the television (134) in the hotel room, view images captured at the venue. The television (134) may include an input device operable to receive selections from the patron (2), such that the patron (2) may use the television to select images, audio, products (110), and the like. The patron (2) may receive one or more selected products (110) at any suitable location, such as the patron's hotel room, at the front desk of the hotel, or elsewhere.

In another embodiment, the services comprising embodiments of the present invention are provided through the Internet via a web site. Patrons (2) may order an image capture device (110), order venue tickets, preview images, select images or audio, alter images, make submissions, and/or select products through the web site. In this embodiment, the user interface (108) thus comprises the web site, which may be accessed through any suitable user interface device, including but not limited to those shown in FIG. 5. Such a web site may be owned and/or operated by a venue. Alternatively, the web site may be owned and/or operated by any other entity. The web site may also provide links to web sites for venues. Other configurations and features of a web site will be apparent to those of ordinary skill in the art.

It will be appreciated that one or more images may be watermarked with a logo of the venue and/or service provider. For example, images may be watermarked during the preview process to discourage patrons (2) from copying the images without authorization or for other purposes. The watermark may be removed from images as they are incorporated into the product(s) (110), or may stay on/in the images.

In another embodiment, the venue and/or service provider reviews one or more of the images, and offers prizes or other benefits to patrons (2) based on the images (e.g., best photo, funniest photo, etc.). In yet another embodiment, a patron (2) or other user is permitted to view images and/or make selections via the user interface (108) for a limited time only. Such a limited time may begin running on the day of the patron's visit to the venue, on the day the patron (2) logs in to the system (400) or at any other suitable time.

It will be appreciated that embodiments of the present invention may be used to generate revenue in a variety of ways. By way of example only, a venue may charge a fee for entry into the venue. Costs of using at least a portion of the image capture and distribution system described herein may be lumped into this entry fee. Similarly, using the example of a hotel as a service provider, the costs of using at least a portion of the image capture and distribution system may be lumped into the cost of a hotel room.

Alternatively, costs could be based on a patron's use of the system. For instance, a patron (2) may be charged a rental fee for using a provided camera (32) or other provided equipment. In lieu of or in addition to being charged a fee for using a provided camera (32) or other provided equipment, a patron (2) may be charged a deposit, which may be returned to the patron (2) upon return of the provided camera (32) or other provided equipment in good working order. As another example of use-based pricing, a patron (2) may be permitted to capture and/or select from a limited number of images for an initial fee. This number of available images could be increased, such as in tiers, with an increasing fee. Other use-based fee structures will be apparent to those of ordinary skill in the art.

Costs may also be assessed as a one-time fee for subscribing to a centralized service. In this embodiment, a subscription may permit a subscribing patron (2) to use a service comprising embodiments of the present invention at a plurality of venues. By way of example only, where a service provider is an entity operating via a web site, a patron (2) may subscribe to the service via the web site for a fee. Images captured at venues may then be uploaded to the web site, and the patron (2) may make selections through the web site. Where applicable, products may be delivered via the web site. At least a portion of these services may be paid for by the subscription fee. Other subscription-based fee structures and variations will be apparent to those of ordinary skill in the art.

At least a portion of one or more of the revenue generating examples described above may be combined. While several examples of revenue generation have been cited herein, those of ordinary skill in the art will appreciate that there are a variety of other ways in which revenues may be generated from at least a portion of an image capture and distribution system.

Having shown and described various embodiments and concepts of the invention, further adaptations of the methods and systems described herein can be accomplished by appropriate modifications by one of ordinary skill in the art without departing from the scope of the invention. Several of such potential alternatives, modifications, and variations have been mentioned, and others will be apparent to those skilled in the art in light of the foregoing teachings. Accordingly, the invention is intended to embrace all such alternatives, modifications and variations as may fall within the spirit and scope of the appended claims and is understood not to be limited to the details of structure and operation shown and described in the specification and drawings.

We claim:

1. A method for processing images captured at a venue, the method comprising:
   (a) receiving one or more images, wherein at least one image of the one or more images is captured at the venue using an image capture device associated with the venue, and at least a second image of the one or more images is capture by a user device, wherein the images are associated with a unique identifier, wherein the at least one image captured at the venue using an image capture device associated with the venue depicts one or more patrons at the venue;
   (b) associating the images with the one or more patrons of the venue, wherein the one or more patrons are associated with the unique identifier, wherein the act of associating comprises matching the unique identifier associated with the images with the corresponding one or more patrons also associated with the unique identifier;

(c) storing the images; and (d) presenting at least a portion of the images to the one or more patrons, wherein the act of presenting comprises displaying an interactive map of the venue to the one or more patrons, wherein the interactive map includes one or more selectable indicators configured to show at least a portion of the images when the one or more selectable indicators is selected.

2. The method of claim 1, wherein the images are associated with one or more points of interest at the venue, wherein the one or more points of interest are indicated by the interactive map of the venue.

3. The method of claim 2, wherein each of the selectable indicators of the interactive map of the venue are associated with corresponding ones of the points of interest, wherein each of the selectable indicators is configured to show at least a portion of the images associated with the corresponding point of interest when one of the selectable indicators is selected.

4. The method of claim 3, wherein at least one of the points of interest corresponds with a location of the image capture device when the associated image was captured.

5. The method of claim 3, wherein the points of interest correspond with locations of the one or more patrons when the associated images were captured.

6. The method of claim 3, wherein the points of interest correspond with locations of the subject matter captured in the associated images.

7. The method of claim 1, wherein the interactive map is displayed to the one or more patrons on a computer via a network.

8. The method of claim 1, wherein the interactive map is displayed to the one or more patrons on a mobile device via a network.

9. The method of claim 1, wherein at least a portion of the images are received from a cell phone device.

10. The method of claim 1, further comprising receiving location information associated with each of the images, wherein each of the selectable indicators is associated with at least part of the location information.

11. The method of claim 10, wherein the location information is also captured by the image capture device.

12. A method of processing images captured at a venue, the method comprising:

(a) receiving one or more images, wherein the images were captured using an image capture device, wherein the one or more images comprise non-imageable information identifying a first time identifier for each of the one or more images wherein the image capture device records the first time identifier when each image of the one or more images is captured;

(b) receiving a first location information associated with each of the images, wherein the first location information was captured using a first GPS device;

(c) providing the patron with a second GPS device, wherein the second GPS device records a second location information and a second time identifier;

(d) receiving the second location information and the second time identifier associated with the patron;

(e) associating a patron with the images, wherein the step of associating of the patron with the images comprises:
  i. correlating the first location information with the second location information, and
  ii. correlating the first time identifier with the second time identifier; and (f) providing the patron with access to the images, wherein the access to the images further includes access to at least a portion of the associated location information.

13. The method of claim 12, wherein the image capture device comprises a cell phone.

14. The method of claim 12, wherein the image capture device is operably configured to wirelessly transmit the images captured by the image capture device, wherein the act of receiving one or more images comprises receiving at least part of the one or more images wirelessly from the image capture device.

15. The method of claim 12, wherein the first GPS device is integrated into the image capture device.

16. The method of claim 15, wherein the image capture device is operably configured to wirelessly transmit the first location information captured by the first GPS device, wherein the act of receiving the first location information comprises receiving at least part of the first location information wirelessly from the image capture device.

17. The method of claim 15, wherein the image capture device is operably configured to store the first location information captured by the first GPS device each time an image is captured by the image capture device.

18. A method of processing images captured at a venue, the method comprising:

(a) associating a patron with a unique identifier;

(b) receiving a first set of one or more images captured at a first venue, wherein the first set of one or more images are captured by one or more image capturing devices associated with the first venue, wherein the first set of images comprise non-imageable information identifying the first venue;

(c) receiving a second set of one or more images captured at a second venue, wherein the second set of one or more images are captured by one or more image capturing devices associated with the second venue, wherein the second set of images comprise non-imageable information identifying the second venue, and wherein the second venue and the first venue are distinct venues;

(d) associating the first and second sets of images with the patron via the unique identifier; and (e) presenting at least a portion of the first set of images and at least a portion of the second set of images to the patron, wherein the act of presenting is performed in accordance with the unique identifier associated with the patron to whom the images are presented.

19. The method of claim 18, wherein the act of presenting comprises displaying a user interface to the patron, wherein the user interface provides one or more selectable indicators, wherein each of the selectable indicators is associated with a corresponding one of the venues in accordance with the non-imageable information identifying the venues associated with the first and second sets of images, wherein the user interface shows at least a portion of the images from the corresponding venue when the one or more selectable indicators is selected.

* * * * *